United States Patent [19]
Parker et al.

[11] Patent Number: 5,397,755
[45] Date of Patent: Mar. 14, 1995

[54] LOW DENSITY GLASSY MATERIALS FOR BIOREMEDIATION SUPPORTS

[75] Inventors: Frederick J. Parker; Awdhoot V. Kerkar, both of Columbia; Rasto Brezny, Catonsville, all of Md.

[73] Assignee: W. R. Grace & Co.-Conn., New York, N.Y.

[21] Appl. No.: 84,850

[22] Filed: Jun. 29, 1993

[51] Int. Cl.⁶ ........................ B01J 20/20; B01J 37/36
[52] U.S. Cl. ............................ 502/7; 502/413; 502/416; 210/615; 435/176
[58] Field of Search ............... 502/7, 413, 416; 435/176, 262; 210/601, 615, 617, 150, 151

[56] References Cited

U.S. PATENT DOCUMENTS

3,929,630 10/1975 Smith .................... 210/17

FOREIGN PATENT DOCUMENTS

| | | |
|---|---|---|
| 8207944 | 12/1983 | Japan. |
| 2238880 | 9/1990 | Japan. |
| 2252669 | 10/1990 | Japan. |
| 3049678 | 3/1991 | Japan. |
| 3087183 | 4/1991 | Japan. |
| 3172168 | 7/1991 | Japan. |
| 3505163 | 11/1991 | Japan. |

OTHER PUBLICATIONS

Groffman, et al: "Removing Lead from Watewater Using Zeolites," in *Water Environment & Technology*, May 1992, p. 54.

Schwartz, et al: "The Use of Fluid Catalytic Cracking Catalyst in Activated Sludge Wastewater Treatment," in *Journal WPCF*, vol. 48, No. 2, pp. 274–280 (Feb. 1976).

Krause, M., New Glass, 1990, 5(2), 209–16.

Menke and Rehm (Applied Microbiology Biotechnology, 1992, 37:655–661).

Forster, H., et al in Fortschr. Mineral., Beih., 63(2), 1–24.

*Primary Examiner*—Asok Pal
*Assistant Examiner*—P. Achutamurthy
*Attorney, Agent, or Firm*—Beverly J. Artale

[57] ABSTRACT

A bioremediation support for the support of microorganisms used in the biotreatment of an aqueous waste stream or contaminated vapor is made of a low-density siliceous glassy material. This material has a cellular or frothy texture, large pores of greater than 1,000 Anstrom units in diameter dispersed throughout the material, a high macropore volume in pores of greater than 1,000 Å of more than 0.3 cc/cc and a BET surface area of greater than 10 m²/g. A preferred material is pumice.

8 Claims, 2 Drawing Sheets

LOW DENSITY GLASSY MATERIALS FOR BIOREMEDIATION SUPPORTS

BACKGROUND OF THE INVENTION

1. Field

This invention relates to using siliceous glassy, low-density macroporous materials as biosupports for bacteria.

2. Description of Previously Published Art

Catalytic biosupports are hosts for bacteria which metabolize toxic or polluting chemicals in waste streams into environmentally harmless products. This is usually done by pumping the liquid through a reactor vessel containing the bacteria on an inorganic host media. Properties of the support for this application include:

attraction of the bacteria to the support material,
high surface area,
mechanical integrity,
non-biocidal,
cost effective,
insensitive to process upsets (e.g. pH, temperature, concentration of organic waste, etc.), and
large macropore volume to sustain bacterial growth and diffusion of nutrients.

Examples of currently used materials are granulated carbon; extruded diatomaceous earth, clay, and zeolites; plastics; biofilms; and various extruded ceramic oxides. The majority of existing products contain primarily micropores (<1000 Å) or limited macroporosity at or near the surface of the media. This limits the surface area on the media which is an effective host for microorganisms. Furthermore, most manufactured media require extensive powder processing and fabrication methods which may include mixing and milling of raw materials, spray drying, formulation development, forming (extrusion, injection molding, etc.), cutting, drying and calcining. The final cost of the product necessarily reflects the cost of raw materials, processing and fabrication.

Processes such as extrusion generally impose a compromise between strength and porosity, two critical properties which conflict with one another in most commercial processes. Highly macroporous materials generally mean low strengths, and vice-versa. Desired sizes of macropores for bioremediation are at least 1000 Å, and preferentially 10,000 Å. Pore volume ranges from 0.1 to about 0.5 cc/cc for biosupports. Increases in macropore volume and surface area mean greater area on which the bacteria can live. Greater concentrations of bacteria, in turn, metabolize larger amounts of waste organics into environmentally safe products.

Mechanical durability is important against attrition in both fixed and moving bed reactors, as well as during handling and transportation. In fabricated ceramic articles made from, for example, diatomaceous earth or clay, low calcination (sintering) temperatures maintain high porosity while creating limited grain boundary bonding. In general, these low temperatures do not provide high strengths relative to materials produced at very high temperatures or from a molten state.

Natural materials have been utilized in the manufacture of biosupports. Typical examples include the use of thermally-treated smectite clays (Krause, M., *New Glass*, 1990, 5(2), 209-16); sepiolite (J02252669 and J02238880); and sintering a mixture of natural silica rock, clay, feldspar, sericite, and alumina sediment to produce a low-density component for wastewater treatment (J03172168). Other patents teach the fabrication of media from inorganic ceramic materials such as alumina (J03049678); magnetic glass (J03505163); and titanium oxide, zirconium oxide or silicon carbide (J03087183).

Menke and Rehm (Applied Microbiology Biotechnology, 1992, 37:655-661) described the use of an unspecified lava rock as a substitute for the propagation of Alcaligenes bacteria. No physical properties (e.g., porosity, density, composition) were specified for the lava material. The term "lava" is an all-encompassing term which denotes any rock created by solidification of a natural molten source. No aspects of composition, texture, grain size, or physical properties can be inferred from the term. Lava encompasses a wide range of rock types including granites, gabbros, basalts, scorias and rhyolites, each of which possess a specific set of physical properties, compositions and origins.

Foerster, H., et al in Fortschr. Mineral., Beih., 63(2), 1-24 discuss Eifel lava and show that it is mainly basaltic in nature. It has been mined for use as a filler for trickling bed filters in sewage treatment applications. While other volcanic rocks are mined in this area, no others (including pumice) are mentioned as having use in waste treatment applications.

3. Objects of the Invention

It is an object of this invention to use macroporous low-density glassy materials as biosupports for the sustenance and propagation of bacteria for bioremediation wastewater treatment.

It is a further object of this invention to utilize biosupports from low cost, natural, commercially-available raw materials at a cost of less than 50 cents/pound.

It is a further object of this invention to utilize biosupports from selected naturally occurring siliceous materials having macroporosity and continuous pore structures which allow diffusion of nutrients throughout the body and hence bioactivity throughout media rather than strictly at or near the surface.

It is a further object of this invention to utilize biosupports having strength/abrasion resistance.

It is a further object of this invention to utilize biosupports for wastewater treatment with a low bulk density (0.8-1.2 g/cc).

It is a further object of this invention to utilize biosupports composed predominately of $SiO_2$ (Å 60 wt %).

It is a further object of this invention to utilize pumice mixed with at least one additional biosupport having unique properties (e.g., adsorption capabilities, buffering capacity, etc.) to produce a lower cost biosupport with tailorable properties.

These and further objects will become apparent as the description of the invention proceeds.

SUMMARY OF THE INVENTION

Bioremediation supports are made from low-density siliceous glassy materials and products thereof which exhibit cellular or frothy textures. Examples are pumice, thermally treated obsidian and perlite, or synthetic equivalents. Laboratory testing under simulated wastewater treatment conditions shows luxuriant growths of desired microbes with excellent bioactivity throughout such media compared to other commercially-available bioremediation supports. The media have high compressive strengths even though they are low-density and very porous. The large macropores allow bacterial growth well into the interior of the media to promote rapid bacterial revitalization following upset conditions. Such materials alone can be utilized as biosupports, or can be mixed with, or co-extruded with, more costly supports materials (e.g., zeolite materials) to produce a lower cost support with tailorable properties.

BRIEF DESCRIPTION OF THE DRAWINGS

FIG. 3: shows a typical pore size distribution for the same material illustrated in FIGS. 1 and 2.

DESCRIPTION OF THE PREFERRED EMBODIMENTS

Figure 1B:
FIGS. 1 and 2: Scanning electron micrographs which illustrate the luxuriant growth of pseudomonas bacteria, even in macroporsity at the center of the pellet.
Figure 1A:
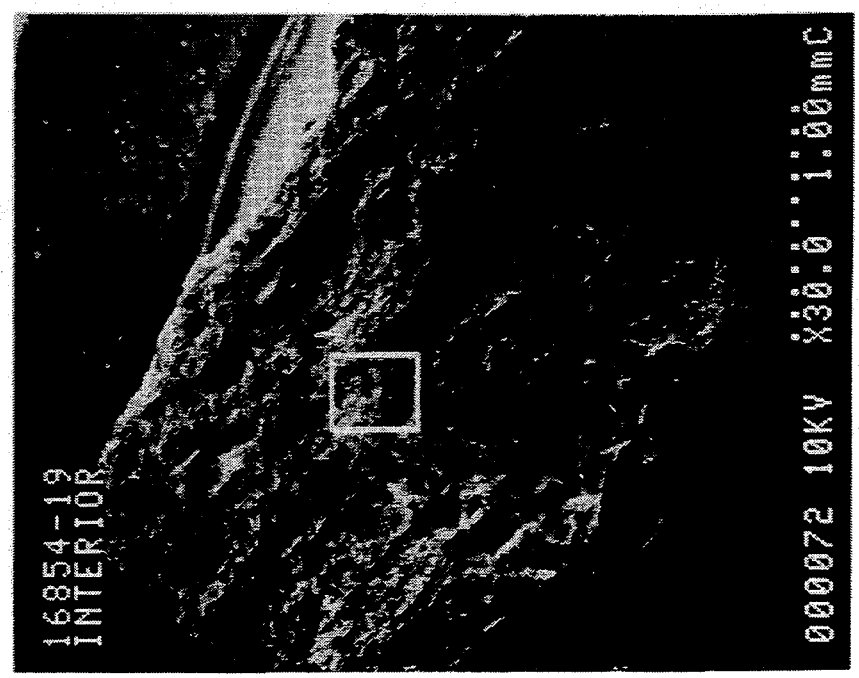

The materials claimed as bioremediation supports are siliceous, glassy materials with a frothy, cellular texture. Preferred materials are pumice, or thermally treated obsidian or perlite, or synthetic equivalents. The texture is due to the high volume of spherical and tubular pores which traverse the material in three-dimensions. Such structures are attributed to the rapid escape of volatile phases (e.g., water vapor and other gasses). X-ray diffraction shows these materials to be characterized by a predominately amorphous or poorly crystalline structure. Small amounts of crystalline phases, such as quartz or feldspar, may also be present, however.

The term lava is common usage for any volcanic rock which solidified from a melt upon cooling. It does not indicate texture, chemistry, or any other physical properties. Such properties are the result of the composition of the melt, rate of cooling, melt viscosity, etc. In this case, pumice has been found to possess an unique set of physico-chemical properties which make it ideal for bioremediation.

Samples of well-known porous "lavas" were characterized and properties compared to pumice. Samples chosen were a highly porous (vesicular) Hawaiian Basalt, a porous Virginia Diabase, and a Utah Rhyolite. The basalt is more iron-calcium rich than pumice, but its texture most closely resembled that of pumice. Rhyolite has a bulk chemistry approximately that of pumice, but does not have the same texture. Diabase, basalt and rhyolite are composed entirely of crystalline phases (e.g. Olivine, Feldspar, etc.) according to x-ray diffraction. Properties critical to a good bioremediation substrate (e.g. macroporosity, density, surface area, etc.) are lacking in all but the pumice sample. Chemical analyses and properties comparing different "lavas" are shown below:

TABLE 1

| | Element Composition of Porous Lavas | | | |
|---|---|---|---|---|
| Oxide wt % | Diabase | Basalt (Hawaiian) | Rhyolite (Utah) | Pumice (Idaho) |
| $SiO_2$ | 51.7 | 50.5 | 73.7 | 71.8 |
| $TiO_2$ | 0.8 | 3.6 | 0.2 | 0.1 |
| $Al_2O_3$ | 15.0 | 13.9 | 13.5 | 12.3 |
| $Fe_2O_3$ | 11.8 | 1.0 | 1.3 | 2.0 |
| FeO | — | 9.8 | 0.8 | — |
| MgO | 7.4 | 7.1 | 0.3 | — |
| CaO | 10.8 | 11.3 | 1.1 | 0.7 |
| $Na_2O + K_2O$ | 2.7 | 2.0 | 8.4 | 8.1 |

TABLE 2

| | Properties[1] Of Porous Lavas | | | |
|---|---|---|---|---|
| | Lava (Origin) | | | |
| | Pumice (Idaho) | Vesicular Basalt (Kalapona, Hawaii) | Rhyolite (Thomas Range, VT) | Porous Diabase (Chantilly, VA) |
| Bulk Density g/cc | 1.14 | 2.60 | 2.14 | 2.00 |
| Total Volume Porosity (Etot) cc/cc | 0.524 | 0.128 | 0.157 | 0.269 |
| Total Volume Porosity >1000Å (Emac) cc/cc | 0.446 | 0.109 | 0.126 | 0.248 |
| Total Volume Porosity >10,000Å cc/cc | 0.324 | 0.088 | 0.092 | 0.176 |
| Surface Area $m^2/g$ | 27 | 1 | 4 | 4 |

[1]Determined by Mercury Porosimetry Techniques

An especially preferred material is Wyoming pumice. This material is highly siliceous, containing 76 wt % $SiO_2$, 12 wt % $Al_2O_3$, and the balance $K_2O$, CaO, $Na_2O_3$, $Fe_2O_3$, etc. The low average density of 1.15 g/cc reflects the large volume of interconnected porosity throughout the body of the sample. However, densities of individual samples range between 0.8–1.3 g/cc. X-ray diffraction shows a predominant glass "hump" between 15°–40° 2-theta, on which is superimposed a trace of crystalline silica (alpha quartz).

Figure 2:
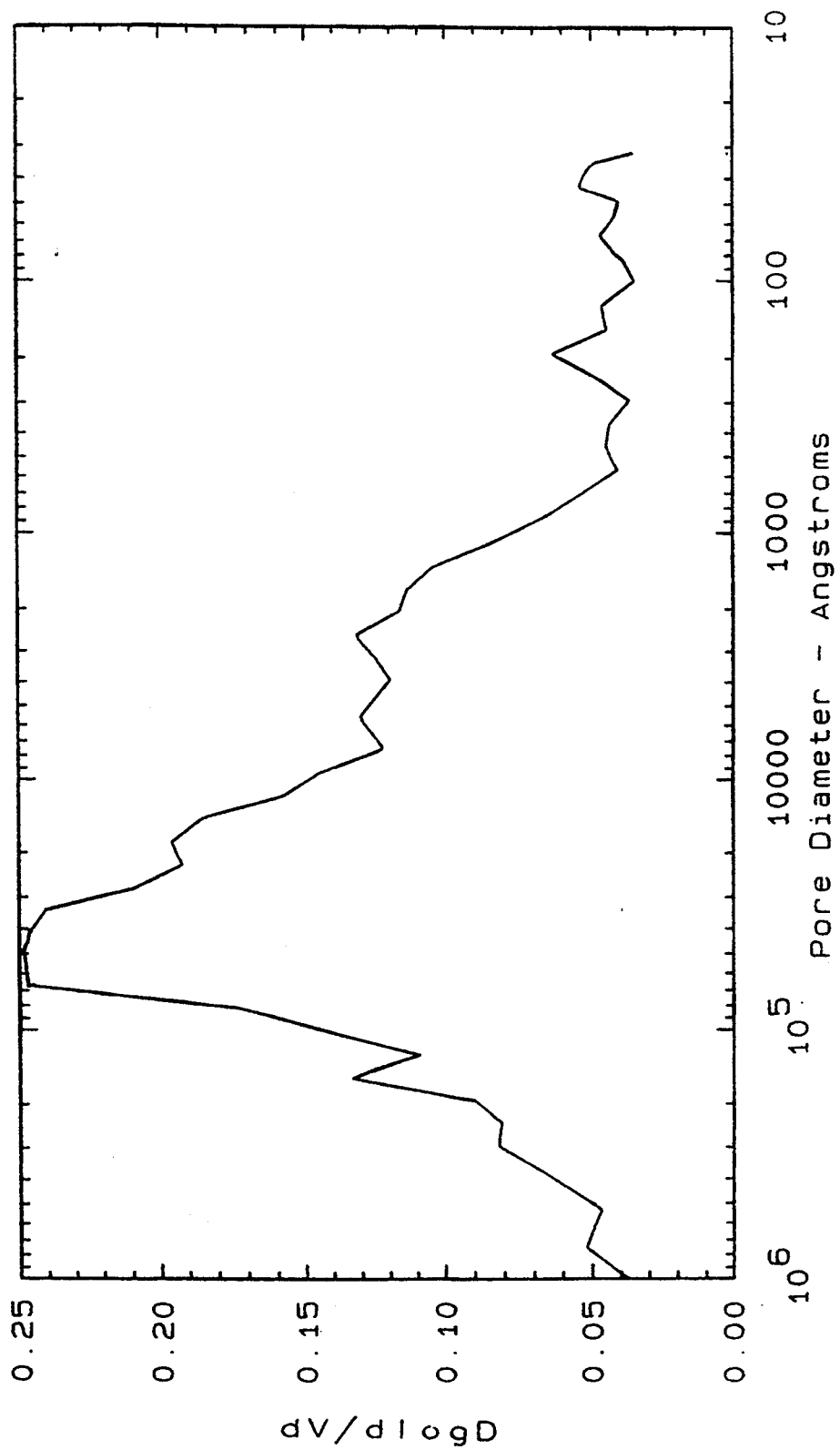

Mercury Intrusion techniques (using a Micromeritics Autopore 9220 from Micromeritics, Norcross Ga.) were used to characterize a typical sample of ⅛" pumice granules. Results are shown in FIG. 2 of the material in Example 1, which was shown to be bioactive. Volumetric porosity averages 0.48 cc/cc, with the majority (84%) being macroporosity in the preferred 1,000–100,000 Å range. Porosity is shown to be open and continuous by scanning electron microcopy. Surface area is 27 m2/g sample.

Despite the highly porous nature of the pumice, evaluations have confirmed the material maintains good compressive strength. Determination of compressive strength entails putting a pumice sample between two parallel plates, and applying a load at a constant rate until failure is observed. Failure is defined as the breaking or deformational crushing of the body. Media as irregular particles on the order of +3.5/−7 mesh (Tyler) diameter are used. A mechanical test apparatus such as a microprocessor controlled Instron 4204 Materials Testing System is suitable for such measurements. (Instron Corp., Canton, Mass.). Results show values ranging from 13 to 74 pounds load, with the overall average for 17 samples being 49 pounds. Despite the high porosity, the resultant strength is also high. This is due to rapid solidification from the molten state, resulting in strong, intimate glass-like bonding.

Pumice sieved to the desired size range (+3.5/−7 mesh is preferred) should be washed prior to use to remove dust or other fine particle containments which could plug porosity. No other physical or chemical treatments are required prior to use.

In summary, the preferred material has an advantageous open pore structure throughout the matrix particle rather than strictly surface pores. It has a very high macropore fraction of the desired larger size pores.

These larger pores permit the bacteria to propagate in the pores and for the nutrients to diffuse throughout the support. It has a higher surface area on which bacteria can adhere and propagate. Finally, it is made of glassy material which provides it with high strength.

In addition to natural materials (e.g. pumice), highly macroporous siliceous glassy materials for biosupports could be made synthetically. For example, a siliceous composition within the compositional ranges claimed could be prepared as a melt which could then be processed to give similarly porous, high strength materials. This can be done by ejecting gas filled particles of the melt into an air stream at high speeds in a modification of the process used to produce glass microballoons or microspheres. Alternately, a melt stream could be rapidly ejected from an air stream into a quenching media. In each case, a glass (i.e. predominately non-crystalline according to X-ray Diffraction) product containing abundant macroporosity due to entrapped gas could be obtained. Such products are within the scope of the invention if the final properties are within the ranges claimed.

The biosupports according to the present invention are useful for wastewater cleanup in place of commercially available, man-made (extruded) pellets with similar colonization levels ($10^6$–$10^7$ colony-forming units/gm. support), and regeneration capabilities following upset conditions. The biosupports of the present invention have good mechanical integrity, and are low cost compared to man-made materials. They can be used alone, or mixed with man-made supports having specific advantages (e.g., buffering capacity, adsorption, etc.) to make a tailorable, low-cost support.

For further information on using bioremediation supports attention is directed to three co-pending applications filed Dec. 21, 1992, the entire contents of which are incorporated herein by reference.

U.S. Ser. No. 994,222 discloses bioremediation support material having a group of large pores with pore diameters as measured by mercury porosimetry of from about 0.5 to 100 microns, said large pores providing a pore volume of from about 0.1 to 1.0 cc/g.

U.S. Ser. No. 997,261 discloses an improved upset resistant support having ultimate particles of a zeolite.

U.S. Ser. No. 993,745 discloses an improved upset resistant support with activated carbon.

Biosupports made of low-density pumice (0.8–0.95 g/cc) fraction can be useful as "floaters" for oil/organic spills on water bodies which require bioremediation cleanup.

Having described the basic aspects of our invention, the following examples are given to illustrate specific embodiments thereof.

EXAMPLE 1

Pumice media ($\frac{1}{8}$-$\frac{1}{4}$ inch in diameter) is put into a column reactor to initiate bacterial colonization of pseudomonas. The aqueous media contains 100 ppm phosphorus (as potassium phosphate) as a buffer. Nutrients in the form of 1 gm/liter ammonium sulfate (nitrogen source) and 100 ppm phenol (carbon source) are added. After 15 days, samples are removed and viable counts of bacterial growth were determined to be $10^6$–$10^7$ colony forming units per gram support. This value compares favorably with current commercial products. In addition, bacterial colonization deep in the macropores of the bulk support were observed. This observation means interior cells could survive severe upset conditions (nutrient starvation, pH surges, etc.), allowing rapid re-colonization once equilibrium conditions are reinstated. The large macropore fraction in which bacterial growth flourishes into the interior of the media is an advantage over existing bioremediation supports.

EXAMPLE 2

A three liter reactor containing $\frac{1}{8}$-$\frac{1}{4}$ inch pumice chips was run at equilibrium conditions at pH=7.4. NMP degradation was measured by HPLC to determine activity of the system. After 80 hours, the pH was rapidly reduced to pH=2 with the addition of sulfuric acid and held for 20 hours, at which point the pH was raised back to 7.4. NMP degradation dropped during a period of about 90 hours, at which point recovery began. The reactor was back to full activity 140 hours after the end of the pH upset.

Commercial carbon beads and extrudate pellets of diatomaceous earth underwent similar acid shock experiments. Both samples showed a large loss in activity, followed by full recovery at 140—140 hours after the pH shock. Thus, pumice as a biosupport has been demonstrated to exhibit similar recovery behavior following pH upsets relative to more expensive, commercial biosupports.

EXAMPLE 3

A 30 gm. portion of $\frac{1}{8}$-$\frac{1}{4}$ inch pumice chips was incipiently wetted with about 5 cc of a saturated sucrose solution. The solution was prepared by mixing 120 g. sucrose (Baker Analyzed Reagent) with 60 cc distilled water. The solution was stirred while heated at 45° C. for one hour. The sucrose coated pumice was taken to dryness in a vacuum oven at 40° C. for four hours. The sample was then transferred to a 65 mm dia.×150 mm high ceramic crucible. With a lid on the crucible to generate a stagnant atmosphere, the sample was heated in a Lindbergh 1000° C. box furnace as follows: heat to 550° C. at 5°/minute, hold at 550° C./two hours, and cool at 5°/minutes. The sample was removed, soaked for 16 hours in MilliQ water, drained and dried again for four hours at 40° C.

To measure N-Methyl Pyrollidone (NMP) adsorption, 6 g of the carbon-coated pumice was placed in 60 g of a 4900 ppm NMP solution. The sample was agitated for 18 hours at 80 rpm on an Environmental Incubator Shaker. NMP concentration of the solution in contact with the pumice was then determined, along with that of the stock solution. The difference between NMP concentration of the reference and test solutions was the NMP adsorbed on the carbon-coated pumice. In this case, a pickup of 280 ppm, or 46 ppm/g pumice sample was determined.

This experiment demonstrates that very low cost pumice can be effectively coated with carbon capable of organic (e.g. NMP) adsorption. This is critical to rapid recovery of bioremediation systems following nutrient saturation and related upset conditions.

It is understood that the foregoing detailed description is given merely by way of illustration and that many variations may be made therein without departing from the spirit of this invention.

What is claim is:

1. A bioremediation support for the support of microorganisms for the biotreatment of an aqueous waste stream or contaminated vapor, comprising a pumice material and at least one additional support material having adsorption properties or buffering capacity, said pumice material having a cellular or frothy texture;

macropores of greater than 1,000 Å in diameter dispersed throughout the material;

a macropore volume in pores of greater than 1,000 Å of more than 0.3 cc/cc;

a particle size of about +3.5/−7 mesh in accordance with the Tyler convention;

a bulk density of from about 0.8 to about 1.2 g/cc; and a BET surface area of greater than 10 m²/g.

2. A bioremediation support according to claim 1, wherein the additional biosupport having absorption capabilities is activated carbon.

3. A bioremediation support according to claim 1, wherein said material has an average crush strength of greater than 40 pounds load.

4. A bioremediation support according to claim 1, wherein the pumice is washed to remove impurities in the pores.

5. A bioremediation support according to claim 1, wherein said pumice material is Idaho pumice.

6. A bioremediation support according to claim 1, wherein said pumice material is Wyoming pumice.

7. A bioremediation support according to claim 1, wherein the support has a low bulk density of about 0.8–0.95 g/cc.

8. A bioremediation support according to claim 1, wherein the additional biosupport in a zeolite.

* * * * *